United States Patent
Ishizuka et al.

(10) Patent No.: US 8,513,336 B2
(45) Date of Patent: Aug. 20, 2013

(54) FLAME-RETARDANT CHLORINE-CONTAINING RESIN COMPOSITION

(75) Inventors: Hidehiro Ishizuka, Saitama (JP); Taro Mitsudera, Saitama (JP); Takayoshi Kaneda, Saitama (JP); Yuki Endo, Saitama (JP)

(73) Assignee: Adeka Corporation, Tokyo (JP)

( * ) Notice: Subject to any disclaimer, the term of this patent is extended or adjusted under 35 U.S.C. 154(b) by 199 days.

(21) Appl. No.: 12/866,115

(22) PCT Filed: Feb. 16, 2009

(86) PCT No.: PCT/JP2009/052568
§ 371 (c)(1),
(2), (4) Date: Aug. 4, 2010

(87) PCT Pub. No.: WO2009/116339
PCT Pub. Date: Sep. 24, 2009

(65) Prior Publication Data
US 2010/0317771 A1    Dec. 16, 2010

(30) Foreign Application Priority Data
Mar. 17, 2008   (JP) ................................. 2008-068304

(51) Int. Cl.
*B29C 47/00* (2006.01)
*C08K 5/49* (2006.01)

(52) U.S. Cl.
USPC ............................................. 524/13; 524/115

(58) Field of Classification Search
USPC ......................................................... 524/13
See application file for complete search history.

(56) References Cited

U.S. PATENT DOCUMENTS

| | | | |
|---|---|---|---|
| 7,449,577 B2 | 11/2008 | Kimura et al. | |
| 2003/0088000 A1 | 5/2003 | Kimura et al. | |
| 2005/0256234 A1* | 11/2005 | Kurumatani et al. | 524/115 |
| 2006/0167256 A1 | 7/2006 | Kimura et al. | |

FOREIGN PATENT DOCUMENTS

| | | |
|---|---|---|
| CN | 1662629 | 8/2005 |
| JP | 05-051504 | 3/1993 |
| JP | 05-331336 | 12/1993 |
| JP | 07-009438 | 1/1995 |
| JP | 07-149982 | 6/1995 |
| JP | 9-104010 | 4/1997 |
| JP | 09104010 A * | 4/1997 |
| JP | 9-227466 | 9/1997 |
| JP | 09-239707 | 9/1997 |
| JP | 10-231405 | 9/1998 |
| JP | 11-005909 | 1/1999 |
| JP | 2003-026935 | 1/2003 |
| JP | 2004-238568 | 8/2004 |
| JP | 2005-097461 | 4/2005 |
| JP | 2005-113050 | 4/2005 |
| JP | 2005097461 A * | 4/2005 |
| JP | 2005-120021 | 5/2005 |
| JP | 2006-348228 | 12/2006 |
| JP | 2007-070615 | 3/2007 |
| JP | 2007-262317 | 10/2007 |
| JP | 2008-208269 | 9/2008 |
| WO | WO 2004/000973 | 12/2004 |
| WO | WO 2005/082852 | 9/2005 |

OTHER PUBLICATIONS

Translation of JP2005-097461, Apr. 14, 2005.*
Translation of JP 09104010, Apr. 1997.*
International Search Report, PCT/JP2009/052568, May 19, 2009.
Supplementary European Search Report—EP 09 72 3600—Aug. 12, 2011.
O, Kokubo et al.—Datadase CA [Online] Chemical Abstracts Service, Columbus Ohio, US; "Preparation of water- and heat-resistant phosphoric acid amine salts as fireproofing agents", XP000002655697, retrieved from STN—Database accession No. 1997:587658 *abstract*.
Chinese Official Action—200980104478.6—Nov. 9, 2011.

* cited by examiner

*Primary Examiner* — Hui Chin
(74) *Attorney, Agent, or Firm* — Young & Thompson

(57) ABSTRACT

A flame-retardant chlorine-containing resin composition is obtained by blending components (A), (B), and (C), and additionally component (D) if necessary, into a chlorine-containing resin: Component (A): a (poly)phosphate compound represented by the following general formula (1); Component (B): a (poly)phosphate compound represented by the following general formula (3); Component (C): wood flour; and Component (D): zinc oxide. In the formula (1), n represents a number from 1 to 100; $X^1$ represents e.g. a triazine derivative represented by the general formula (2); and $0 < p \leq n+2$. In the formula (2), $Z^1$ and $Z^2$ each represent e.g. a $-NR^5R^6$ group. In the formula (3), r represents a number from 1 to 100; $Y^1$ represents e.g. $[R^1R^2N(CH_2)mNR^3R^4]$; $R^1$, $R^2$, $R^3$, and $R^4$ each represent e.g. a linear or branched alkyl group having 1 to 5 carbon atoms; m represents an integer from 1 to 10; and $0 < q \leq r+2$.

18 Claims, No Drawings

FLAME-RETARDANT CHLORINE-CONTAINING RESIN COMPOSITION

TECHNICAL FIELD

The present invention relates to a chlorine-containing resin composition that has excellent flame-retardant properties and that is restrained from producing harmful gases and smoke when combusted.

BACKGROUND ART

Attempts have been made in recent years to apply woodgrain patterns and/or woody texture of natural wood to molded products made of chlorine-containing resins such as vinyl chloride, and to use those molded products, which have been provided with color tones and texture close to those of natural wood, as e.g. interior materials for cars, side moldings, interior materials for houses, building materials such as exterior cladding, floor materials for terraces, balconies, decks, etc., materials for civil works, wooden causeways provided e.g. in wetlands in natural parks, handrails made by covering steel pipes, frames for tables, and gaskets (see Patent Documents 1 and 2).

The chlorine-containing resins used for the above products contain a large amount of chlorine in their molecules, and thus have excellent flame-retardant properties. However, the addition of wood flour, which is a flammable material, may impair the resin's flame-retardant properties. Further, chlorine-containing resins are disadvantageous in that they produce chlorine gas or hydrogen chloride gas when exposed to high temperatures above its heatproof temperature in case of fire etc. because they contain chlorine in their molecules, and they also produce toxic gases, such as carbon monoxide, as well as heavy smoke at the time of combustion.

To improve flame-retardant properties of chlorine-containing resins, attempts have been made heretofore to blend antimony trioxide into the resins. The use of antimony trioxide indeed improves flame-retardant properties, but instead tends to worsen the properties relating to emission of smoke and provides no countermeasure against the production of toxic gases, in particular, hydrogen chloride gas and carbon monoxide gas. Antimony trioxide also suffers from containing toxic components such as lead and arsenic as impurities originating from its ore.

Phosphoric ester-based flame retardants have also been used heretofore. For example, Patent Document 3 proposes the combined use of a phosphoric ester flame retardant and zinc hydroxystannate. This countermeasure, however, is also insufficient in restraining smoke emission, and cannot sufficiently restrain the production of toxic gases such as carbon monoxide.

Patent Document 4 proposes a soft vinyl chloride resin composition that achieves low smoke emission by combinedly using a zinc compound, antimony trioxide, and a phosphoric ester. Patent Document 5 proposes a vinyl chloride resin composition for electric wires that achieves low smoke emission by combinedly using an inorganic compound and a condensation organophosphorus compound. However, the low smoke emission properties of these vinyl chloride resin compositions are still insufficient. Further, these countermeasures give no consideration to the emission of toxic carbon monoxide gas and thus cannot prevent emission thereof, nor do these Patent Document provide information about restraining production of carbon monoxide.

Further, Patent Documents 6 and 7 propose synthetic resin compositions that contain flame retardants obtained by combining specific types of phosphates, professing that no harmful gas is emitted at the time of combustion. However, the expression "no harmful gas is emitted" as used in these Patent Documents merely means that there is no emission of harmful gas originating from halogen-based flame retardants (i.e., chlorine gas, hydrogen chloride gas, etc.) because no halogen-based flame retardant is used. This is completely different from the concept of the present invention. Further, Patent Documents 6 and 7 give chlorine-containing resins, such as polyvinyl chloride, as examples of synthetic resins, but they merely provide a list of generally-used synthetic resins and provide no concrete working example. Furthermore, these Patent Documents provide no disclosure nor information about restraining emission of smoke and production of toxic gases, such as carbon monoxide, other than harmful gases originating from halogen.

Patent Document 1: JP-A-10-231405
Patent Document 2: JP-A-9-239707
Patent Document 3: JP-A-5-331336
Patent Document 4: JP-A-5-51504
Patent Document 5: JP-A-7-149982
Patent Document 6: JP-A-2003-26935
Patent Document 7: JP-A-2004-238568

DISCLOSURE OF THE INVENTION

Problems to be Solved by the Invention

Accordingly, an object of the present invention is to provide a chlorine-containing resin composition that contains wood flour but has excellent flame-retardant properties and is restrained from producing harmful gases and smoke when combusted, and in particular, to provide a chlorine-containing resin composition that contains wood flour but has excellent flame-retardant properties and is restrained from producing carbon monoxide.

Means for Solving the Problems

Inventors have made diligent investigation to solve the above-mentioned problem, and have found that blending wood flour and two types of (poly)phosphate compounds of specific structures into a chlorine-containing resin can provide a flame-retardant chlorine-containing resin composition that contains wood flour but has excellent flame-retardant properties and is restrained from producing harmful gases and smoke when combusted, thus arriving at the present invention.

That is, the present invention provides a flame-retardant chlorine-containing resin composition obtained by blending the following component (A), component (B), and component (C) into a chlorine-containing resin:

Component (A): a (poly)phosphate compound represented by the following general formula (1);

Component (B): a (poly)phosphate compound represented by the following general formula (3); and Component (C): wood flour;

[Chem. 1]

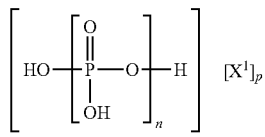
(1)

wherein, n represents a number from 1 to 100; $X^1$ represents ammonia or a triazine derivative represented by the following general formula (2); and $0<p\leq n+2$;

[Chem. 2]

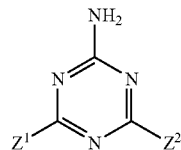
(2)

wherein, $Z^1$ and $Z^2$ may be the same or may be different and each represent a group selected from a group consisting of a —$NR^5R^6$ group [wherein $R^5$ and $R^6$ may be the same or may be different and each represent a hydrogen atom or a linear or branched alkyl or methylol group having 1 to 6 carbon atoms], a hydroxyl group, a mercapto group, a linear or branched alkyl group having 1 to 10 carbon atoms, a linear or branched alkoxy group having 1 to 10 carbon atoms, a phenyl group, and a vinyl group;

[Chem. 3]

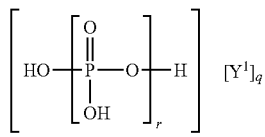
(3)

wherein, r represents a number from 1 to 100; $Y^1$ represents either [$R^1R^2N(CH_2)mNR^3R^4$], piperazine, or a diamine containing a piperazine ring; $R^1$, $R^2$, $R^3$, and $R^4$ each represent a hydrogen atom or a linear or branched alkyl group having 1 to 5 carbon atoms; $R^1$, $R^2$, $R^3$, and $R^4$ may be the same group or may be different from one another; m represents an integer from 1 to 10; and $0<q\leq r+2$.

The present invention further provides a flame-retardant chlorine-containing resin composition further containing zinc oxide as component (D).

The present invention also provides a flame-retardant chlorine-containing resin composition wherein the component (A) is melamine pyrophosphate having a structure in which, in the general formula (1), n is 2, p is 2, and $X^1$ is melamine ($Z^1$ and $Z^2$ in the general formula (2) are —$NH_2$).

The present invention also provides a flame-retardant chlorine-containing resin composition wherein the component (B) is piperazine polyphosphate having a structure in which, in the general formula (3), q is 1 and $Y^1$ is piperazine.

The present invention also provides a flame-retardant chlorine-containing resin composition wherein the piperazine polyphosphate is piperazine pyrophosphate.

BEST MODE FOR CARRYING OUT THE INVENTION

The flame-retardant chlorine-containing resin composition of the present invention will be described in detail below according to preferred embodiments thereof.

The (poly)phosphate compound used as component (A) in the flame-retardant chlorine-containing resin composition of the present invention and represented by the general formula (1) is a salt of phosphoric acid and ammonia or a triazine derivative represented by the general formula (2).

Examples of linear or branched alkyl groups having 1 to 10 carbon atoms as represented by $Z^1$ and $Z^2$ in the general formula (2) include methyl, ethyl, propyl, isopropyl, butyl, sec-butyl, tert-butyl, isobutyl, amyl, isoamyl, tert-amyl, hexyl, cyclohexyl, heptyl, isoheptyl, tert-heptyl, n-octyl, isooctyl, tert-octyl, 2-ethylhexyl, nonyl, and decyl; and examples of linear or branched alkoxy groups having 1 to 10 carbon atoms include groups derived from the alkyl groups listed above.

Specific examples of the triazine derivative include melamine, acetoguanamine, benzoguanamine, acrylguanamine, 2,4-diamino-6-nonyl-1,3,5-triazine, 2,4-diamino-6-hydroxy-1,3,5-triazine, 2-amino-4,6-dihydroxy-1,3,5-triazine, 2,4-diamino-6-methoxy-1,3,5-triazine, 2,4-diamino-6-ethoxy-1,3,5-triazine, 2,4-diamino-6-propoxy-1,3,5-triazine, 2,4-diamino-6-isopropoxy-1,3,5-triazine, 2,4-diamino-6-mercapto-1,3,5-triazine, and 2-amino-4,6-dimercapto-1,3,5-triazine.

Examples of the (poly)phosphate compound preferably used as the component (A) and represented by the general formula (1) include: salts of phosphoric acid and melamine; and ammonium polyphosphate compounds. Examples of preferably-used salts of phosphoric acid and melamine include melamine orthophosphate, melamine pyrophosphate, and melamine polyphosphate, and among these, melamine pyrophosphate, which has a structure wherein n is 2, p is 2, and $X^1$ is melamine in the general formula (1), is particularly preferable from the standpoint of flame-retardant properties. A salt of phosphoric acid and melamine can be prepared as follows. For example, in case of melamine pyrophosphate, sodium pyrophosphate and melamine are allowed to react at a given reaction ratio by adding hydrochloric acid, and the reaction product is neutralized with sodium hydroxide, to produce melamine pyrophosphate.

The above ammonium polyphosphate compounds are either a single substance consisting of ammonium polyphosphate or compounds containing ammonium polyphosphate as a main component. Commercially-available products may be used for the single substance of ammonium polyphosphate, and examples of commercially-available products include "Exolit-422" and "Exolit-700" manufactured by Hoechst, "Phos-Chek-P/30" and "Phos-Chek-P/40" manufactured by Monsanto Company, "Sumisafe-P" manufactured by Sumitomo Chemical Co., Ltd., "Terraju-S10" and "Terraju-S20" manufactured by Chisso Corporation.

Examples of the above-mentioned compounds containing ammonium polyphosphate as a main component include: ammonium polyphosphate covered or microencapsulated with a heat-curable resin; ammonium polyphosphate whose surface has been covered with a melamine monomer or other nitrogen-containing organic compounds; ammonium polyphosphate treated with a surfactant or silicone; and ammonium polyphosphate whose solubility has been reduced by addition of melamine etc. during the course of production.

Examples of commercially-available products of compounds containing ammonium polyphosphate as a main component include "Exolit-462" manufactured by Hoechst, "Sumisafe-PM" manufactured by Sumitomo Chemical Co., Ltd., "Terraju-C60", "Terraju-C70", and "Terraju-C80" manufactured by Chisso Corporation.

The (poly)phosphate compound used as the component (B) in the flame-retardant chlorine-containing resin composition of the present invention and represented by the general formula (3) is a salt of phosphoric acid and a diamine or piperazine.

Specific examples of diamines represented by $Y^1$ in the general formula (3) include N,N,N',N'-tetramethyldiaminomethane, ethylenediamine, N,N'-dimethylethylenediamine, N,N'-diethylethylenediamine, N,N-dimethylethylenediamine, N,N-diethylethylenediamine, N,N,N',N'-tetramethylethylenediamine, N,N,N',N'-diethylethylenediamine, tetramethylenediamine, 1,2-propanediamine, 1,3-propanediamine, tetramethylenediamine, pentamethylenediamine, hexamethylenediamine, 1,7-diaminoheptane, 1,8-diaminooctane, 1,9-diaminononane, 1,10-diaminodecane, piperazine, trans-2,5-dimethylpiperazine, 1,4-bis(2-aminoethyl)piperazine, and 1,4-bis(3-aminopropyl)piperazine. All of the above may be commercially-available products.

Examples of (poly)phosphate compounds preferably used as the component (B) and represented by the general formula (3) include salts of phosphoric acid and piperazine. Specific examples of salts of phosphoric acid and piperazine include piperazine orthophosphate, piperazine pyrophosphate, and piperazine polyphosphate, and among these, piperazine polyphosphate, which has a structure in which q is 1 and $Y^1$ is piperazine in the general formula (3), is preferable from the standpoint of heat resistance and flame-retardant properties, and piperazine pyrophosphate is particularly preferable from the standpoint of flame-retardant properties. A salt of phosphoric acid and piperazine can be prepared as follows. For example, piperazine pyrophosphate can be prepared easily as a water-insoluble precipitate by allowing piperazine and pyrophosphoric acid to react in water or in an aqueous methanol solution. Meanwhile, piperazine polyphosphate may be a salt prepared from piperazine and a polyphosphoric acid mixture containing orthophosphoric acid, pyrophosphoric acid, tripolyphosphoric acid, and other polyphosphoric acids, and there is no particular limitation to the formulation of the polyphosphoric acids serving as the starting material.

The amount of the component (A) to be blended to 100 parts by mass of chlorine-containing resin is preferably 0.1 to 40 parts by mass, and more preferably 1 to 30 parts by mass.

The amount of the component (B) to be blended to 100 parts by mass of chlorine-containing resin is preferably 0.1 to 50 parts by mass, and more preferably 1 to 40 parts by mass.

The total amount of the component (A) and the component (B), which are the flame retardant components, to be blended to 100 parts by mass of chlorine-containing resin is preferably 1 to 90 parts by mass, and more preferably 5 to 70 parts by mass. An amount less than 1 part by mass cannot sufficiently impart flame-retardant properties; whereas a blending amount exceeding 90 parts by mass will impair the properties of the resin and is thus not preferable.

The blending ratio (on a mass basis) between the component (A) and the component (B) (the ratio "(A)/(B)") is preferably 20/80 to 50/50, and more preferably 30/70 to 50/50.

In the flame-retardant chlorine-containing resin composition of the present invention, wood flour is used as component (C). The average particle size of the wood flour is preferably 30 to 500 µm, and more preferably 100 to 200 µm. An average particle size of less than 30 µm makes the wood flour's bulk specific gravity small and tends to impair the mixability of the wood flour with the chlorine-containing resin and other blended materials; whereas an average particle size exceeding 500 µm tends to impair the surface state of the molded/shaped product and is thus not preferable.

The types of wood usable for the wood flour are not particularly limited, and usable examples include wood flour made from coniferous trees such as cedar, lauan, Japanese hemlock, and Japanese cypress, and broadleaf trees such as beech, birch, zelkova, and boxtree. It is also possible to use fine particles made by pulverizing sawdust, chaff, or the dusts produced by sanding the surface of a particle board. There is no particular limitation in how to make the wood flour into fine particles, and for example, woodchips may be pulverized using a dry grinding machine.

The amount of the component (C) to be blended to 100 parts by mass of chlorine-containing resin is preferably 10 to 160 parts by mass, and more preferably 60 to 100 parts by mass. A blending amount of less than 10 parts by mass will lack woody texture; whereas an amount exceeding 160 parts by mass tends to impair the evenness and surface state of the product.

The flame-retardant chlorine-containing resin composition of the present invention may also preferably contain zinc oxide, as component (D), as a flame retardant aid. The zinc oxide may be surface-treated. Commercially-available products of zinc oxide may be used, and usable examples include "Zinc Oxide Type 1" (product of Mitsui Mining and Smelting Co., Ltd.), partially-coated zinc oxide (product of Mitsui Mining and Smelting Co., Ltd.), "NANOFINE 50" (ultrafine zinc oxide particles; average particle size: 0.02 µm; product of Sakai Chemical Industry Co., Ltd.), and "NANOFINE K" (ultrafine zinc oxide particles coated with zinc silicate; average particle size: 0.02 µm; product of Sakai Chemical Industry Co., Ltd.).

The amount of the component (D) to be blended to 100 parts by mass of chlorine-containing resin is preferably 0.01 to 10 parts by mass, and more preferably 0.1 to 5 parts by mass. A blending amount of less than 0.01 parts by mass provides only a limited effect as a flame retardant aid; whereas an amount exceeding 10 parts by mass tends to provide no increased effect as a flame retardant aid.

The flame-retardant chlorine-containing resin composition of the present invention is characterized in that the component (A), the component (B), and the component (C) are blended to a chlorine-containing resin composition and that it also preferably contains the component (D). There is no particular limitation to the timing for blending the components (A) to (D) to the chlorine-containing resin. For example, two or more of the components (A) to (D) may be made into a single pack in advance and then the single-pack components may be blended to the chlorine-containing resin; or each component may be blended to the chlorine-containing resin individually.

In cases of employing the single-pack method, the components may be pulverized in advance before being blended, or they may be blended first and then pulverized together.

Further, the flame-retardant chlorine-containing resin composition of the present invention may preferably contain an anti-drip agent to prevent drooling (dripping) of resin at the time of combustion.

Specific examples of the anti-drip agent include: fluorine-based resins such as polytetrafluoroethylene, polyvinylidene fluoride, and polyhexafluoropropylene; alkali metal salt compounds of perfluoroalkane sulfonic acids or alkaline-earth metal salts of perfluoroalkane sulfonic acids, such as perfluoromethane sulfonic acid sodium salt, perfluoro-n-butane sulfonic acid potassium salt, perfluoro-t-butane sulfonic acid potassium salt, perfluorooctane sulfonic acid sodium salt, and perfluoro-2-ethylhexane sulfonic acid calcium salt; and silicone rubbers. One of the above may be used, or two or more of the above may be used mixed. Among the above, polytetrafluoroethylene (PTFE) is used particularly preferably because of its excellent drip-preventing effect.

The amount of the anti-drip agent to be blended to 100 parts by mass of chlorine-containing resin is preferably 0.05 to 5 parts by mass, and more preferably 0.1 to 2 parts by mass. An amount less than 0.05 parts by mass provides only a limited drip-preventing effect; whereas an amount exceeding 5 parts by mass leads to an increase in thermal shrinkage of shaped/molded products which may deteriorate the precision in dimension, and also leads to an increase in cost.

The flame-retardant chlorine-containing resin composition of the present invention may also contain silicone oil to restrain secondary coagulation at the time of blending and to improve water repellency.

Examples of silicone oils include silicone oils having a methyl polysiloxane structure. Silicone oils having a methyl polysiloxane structure include: ones that contain only the dimethyl polysiloxane structure; ones that contain both the dimethyl polysiloxane structure and the methylhydrogen polysiloxane structure; and ones that contain only the methylhydrogen polysiloxane structure. The silicone oil may be epoxy modified, carboxyl modified, carbinol modified, and/or amino modified.

Specific examples of silicone oils may include the following. An example of a silicone oil having a 100% methylhydrogen structure includes "KF-99" (product of Shin-Etsu Chemical Co., Ltd.). Examples partially having a methylhydrogen structure include "HMS-151" (product of Gelest Inc.), "HMS-071" (product of Gelest Inc.), "HMS-301" (product of Gelest Inc.), and "DMS-H21" (product of Gelest Inc.). Examples of epoxy-modified silicone oils include "X-22-2000" (product of Shin-Etsu Chemical Co., Ltd.) and "KF-102" (product of Shin-Etsu Chemical Co., Ltd.). An example of a carboxyl-modified silicone oil includes "X-22-4015" (product of Shin-Etsu Chemical Co., Ltd.). An example of a carbinol-modified silicone oil includes "X-22-4015" (product of Shin-Etsu Chemical Co., Ltd.). An example of an amino-modified silicone oil includes "KF-393" (product of Shin-Etsu Chemical Co., Ltd.).

Examples of the chlorine-containing resin usable in the present invention include: chlorine-containing resins such as polyvinyl chloride, chlorinated polyvinyl chloride, polyvinylidene chloride, chlorinated polyethylene, chlorinated polypropylene, chlorinated rubber, vinyl chloride-vinyl acetate copolymer, vinyl chloride-ethylene copolymer, vinyl chloride-propylene copolymer, vinyl chloride-styrene copolymer, vinyl chloride-isobutylene copolymer, vinyl chloride-vinylidene chloride copolymer, vinyl chloride-styrene-maleic anhydride terpolymer, copolymer of vinyl chloride and an alkyl, cycloalkyl, or arylmaleimide, vinyl chloride-styrene-acrylonitrile copolymer, vinyl chloride-butadiene copolymer, vinyl chloride-isoprene copolymer, vinyl chloride-chlorinated propylene copolymer, vinyl chloride-vinylidene chloride-vinyl acetate terpolymer, vinyl chloride-acrylate copolymer, vinyl chloride-maleate copolymer, vinyl chloride-methacrylate copolymer, vinyl chloride-acrylonitrile copolymer, and vinyl chloride-urethane copolymer; and blends of the above-mentioned chlorine-containing resin(s) and other polymers, including: polyolefins and copolymers thereof, including poly-α-olefins, such as polyethylene, polypropylene, polybutene, and poly-3-methylbutene, ethylene-vinyl acetate copolymer, and ethylene-propylene copolymer; polystyrene; acrylic resin; copolymers of styrene and other monomers (such as maleic anhydride, butadiene, and acrylonitrile); acrylonitrile-butadiene-styrene copolymer; methacrylate-butadiene-styrene copolymer; and polyurethane. One type of the above-mentioned chlorine-containing resin may be used singly, or two or more types may be used mixed.

The flame-retardant chlorine-containing resin composition of the present invention may further include a metal-based stabilizer generally used in chlorine-containing resins. Examples of the metal-based stabilizer include lead-based stabilizers, metal salts of organic acids, organotin-based stabilizers, and composites of the above stabilizers.

Examples of the lead-based stabilizers include white lead, basic lead silicate, basic lead sulfate, dibasic lead sulfate, tribasic lead sulfate, basic lead sulfite, dibasic lead phosphite, a coprecipitate of lead silicate with silica gel, dibasic lead phthalate, tribasic lead maleate, lead salicylate, lead stearate, basic lead stearate, dibasic lead stearate, lead laurate, lead octylate, lead 12-hydroxystearate, lead behenate, and lead naphthenate.

Examples of the metal salts of organic acids include metal salts (e.g., Li, Na, K, Ca, Ba, Mg, Sr, Zn, Cd, Sn, Cs, or Al) of carboxylic acids, organic phosphoric acids, and phenols. Examples of the carboxylic acids include caproic acid, caprylic acid, pelargonic acid, 2-ethylhexanoic acid, capric acid, neodecanoic acid, undecylenic acid, lauric acid, myristic acid, palmitic acid, stearic acid, isostearic acid, 12-hydroxystearic acid, chlorostearic acid, 12-ketostearic acid, phenylstearic acid, ricinoleic acid, linoleic acid, linolenic acid, oleic acid, arachic acid, behenic acid, erucic acid, brassidic acid, and similar acids; mixtures of naturally-occurring acids such as tallow fatty acid, coconut oil fatty acid, Chinese wood oil fatty acid, soybean oil fatty acid, and cottonseed oil fatty acid; benzoic acid, p-t-butylbenzoic acid, ethylbenzoic acid, isopropylbenzoic acid, toluic acid, xylic acid, salicylic acid, 5-t-octylsalicylic acid, naphthenic acid, and cyclohexane carboxylic acid. Examples of the above-mentioned organic phosphoric acids include mono- or di-octylphosphoric acid, mono- or di-dodecylphosphoric acid, mono- or di-octadecylphosphoric acid, mono- or di-(nonylphenyl)phosphoric acid, phosphonic acid nonylphenyl ester, and phosphonic acid stearyl ester. Examples of the above-mentioned phenols include phenol, cresol, ethylphenol, cyclohexylphenol, nonylphenol, and dodecylphenol. The organic-acid metal salt may be a normal salt, an acidic salt, a basic salt, or an overbased complex.

Examples of the above-mentioned organotin-based stabilizers include methylstannoic acid, butylstannoic acid, octylstannoic acid, dimethyltin oxide, dibutyltin oxide, dioctyltin oxide, dimethyltin sulfide, dibutyltin sulfide, dioctyltin sulfide, monobutyltin oxide.sulfide, methylthiostannoic acid, butylthiostannoic acid, octylthiostannoic acid, dibutyltin dilaurate, dibutyltin distearate, dioctyltin dioleate, dibutyltin basic laurate, dibutyltin dicrotonate, dibutyltin bis(butoxydiethylene glycol maleate), dibutyltin methyl.octy.neopentyl glycol maleate, dibutyltin isooctyl.1,4-butanediol maleate, dibutyltin dimethacrylate, dibutyltin dicinnamate, dioctyltin bis(oleyl maleate), dibutyltin bis(stearyl maleate), dibutyltin itaconate, dioctyltin maleate, dimethyltin dicrotonate, dioctyltin bis(butyl maleate), dibutyltin dimethoxide, dibutyltin dilauroxide, dioctyltin ethylene glycoxide, pentaerythrita dibutyltin oxide condensate, dibutyltin bis(lauryl mercaptide), dimethyltin bis(stearyl mercaptide), monobutyltin tris (lauryl mercaptide), dibutyltin-β-mercaptopropionate, dioctyltin-β-mercaptopropionate, dibutyltin mercaptoacetate, monobutyltin tris(isooctyl mercaptoacetate), monooctyltin tris(2-ethylhexyl mercaptoacetate), dibutyltin bis(isooctyl mercaptoacetate), dioctyltin bis(isooctyl mercaptoacetate), dioctyltin bis(2-ethylhexyl mercaptoacetate), dimethyltin bis(isooctyl mercaptoacetate), dimethyltin bis(isooctyl mercaptopropionate), monobutyltin tris(isooctyl mercaptopropionate), bis[monobutyldi(isooctoxycarbonylmethylenethio)tin]sulfide, bis[dibutylmono(isooctoxycarbonylmethylenethio)tin]sulfide, monobutylmonochlorotin bis(isooctyl mercaptopropionate), monobutylmonochlorotin bis(isooctyl mercaptoacetate), monobutylmonochlorotin bis(lauryl mercaptide), butyltin bis(ethylcellosolve maleate), bis(dioctyltin butyl maleate) maleate, bis(methyltin diisooctyl thioglycolate)disulfide, bis(methyl/dimethyltin mono/diisooctyl thioglycolate)disulfide, bis(methyltin diisooctyl thioglycolate)trisulfide, bis(butyltin diisooctyl thioglycolate)trisulfide, and 2-butoxycarbonylethyltin tris(butyl thioglycolate).

The amount of the metal-based stabilizer to be blended to 100 parts by mass of chlorine-containing resin is preferably 0.05 to 10 parts by mass, and even more preferably 0.1 to 5 parts by mass.

Further, the flame-retardant chlorine-containing resin composition of the present invention may also contain a plasticizer. Any kind of plasticizer generally used for vinyl chloride resins may be used in amounts that will not impair the effects of the present invention, and examples include: phthalate-based plasticizers such as dibutyl phthalate, butylhexyl phthalate, diheptyl phthalate, dioctyl phthalate, diisononyl phthalate, diisodecyl phthalate, dilauryl phthalate, dicyclohexyl phthalate, and dioctylterephthalate; adipate-based plasticizers such as dioctyl adipate, diisononyl adipate, diisodecyl adipate, and di(butyl diglycol) adipate; phosphate-based plasticizers such as triphenyl phosphate, tricresyl phosphate, trixylenyl phosphate, tri(isopropylphenyl)phosphate, triethyl phosphate, tributyl phosphate, trioctyl phosphate, tri(butoxyethyl)phosphate, and octyl diphenyl phosphate; polyester-based plasticizers including, as a polyol, ethylene glycol, diethylene glycol, triethylene glycol, 1,2-propylene glycol, 1,3-propylene glycol, 1,3-butanediol, 1,4-butanediol, 1,5-hexanediol, 1,6-hexanediol, neopentyl glycol, or the like, and, as a dibasic acid, oxalic acid, malonic acid, succinic acid, glutaric acid, adipic acid, pimelic acid, suberic acid, azelaic acid, sebacic acid, phthalic acid, isophthalic acid, terephthalic acid, or the like, and also including, as necessary, a monovalent alcohol or a monocarboxylic acid as a stopper; and other plasticizers, such as tetrahydrophthalic acid plasticizers, azelaic acid plasticizers, sebacic acid plasticizers, stearic acid plasticizers, citric acid plasticizers, trimellitic acid plasticizers, pyromellitic acid plasticizers, and biphenylene polycarboxylic acid plasticizers.

Further, the flame-retardant chlorine-containing resin composition of the present invention may also contain various additives generally used as additives for chlorine-containing resins in amounts that will not impair the effects of the present invention. Examples of such additives include organic phosphite compounds, phenol-based or sulfur-based antioxidants, hydrotalcite compounds, epoxy compounds, polyol compounds, β-diketone compounds, UV absorbers, hindered amine-based light stabilizers, and fillers.

Examples of the above-mentioned organic phosphite compounds include triphenyl phosphite, tris(2,4-di-tert-butylphenyl) phosphite, tris(nonylphenyl) phosphite, tris(dinonylphenyl) phosphite, tris(mono- and di-nonylphenyl) phosphite, diphenyl acid phosphite, 2,2'-methylene-bis(4,6-di-tert-butylphenyl)octyl phosphite, diphenyl decyl phosphite, phenyl diisodecyl phosphite, tributyl phosphite, tri(2-ethylhexyl) phosphite, tridecyl phosphite, trilauryl phosphite, dibutyl acid phosphite, dilauryl acid phosphite, trilauryl trithio phosphite, bis(neopentyl glycol).1,4-cyclohexane dimethyl diphosphite, bis(2,4-di-tert-butylphenyl)pentaerythritol diphosphite, bis(2,6-di-tert-butyl-4-methylphenyl)pentaerythritol diphosphite, distearyl pentaerythritol diphosphite, phenyl-4,4'-isopropylidene diphenol.pentaerythritol diphosphite, tetra(C12 to C15 mixed alkyl)-4,4'-isopropylidene diphenyl diphosphite, hydrogenated 4,4'-isopropylidene diphenol polyphosphite, bis(octylphenyl).bis[4,4'-n-butylidene bis(2-tert-butyl-5-methylphenol)].1,6-hexanediol.diphosphite, tetramidecyl.4,4'-butylidene bis(2-tert-butyl-5-methylphenol)diphosphite, hexa(tridecyl).1,1,3-tris(2-methyl-5-tert-butyl-4-hydroxyphenyl)butane.triphosphite, 9,10-dihydro-9-oxa-10-phosphaphenanthrene 10-oxide, and 2-butyl-2-ethylpropanediol.2,4,6-tri-tert-butylphenol monophosphite.

Examples of the above-mentioned phenol-based antioxidants include 2,6-di-tert-butyl-p-cresol, 2,6-diphenyl-4-octadecyloxyphenol, stearyl(3,5-di-tert-butyl-4-hydroxyphenyl)propionate, distearyl(3,5-di-tert-butyl-4-hydroxybenzyl)phosphonate, thiodiethylene-bis[(3,5-di-tert-butyl-4-hydroxyphenyl)propionate], 4,4'-thio-bis(6-tert-butyl-m-cresol), 2-octylthio-4,6-di(3,5-di-tert-butyl-4-hydroxyphenoxy)-s-triazine, 2,2'-methylene-bis(4-methyl-6-tert-butylphenol), bis[3,3-bis(4-hydroxy-3-tert-butylphenyl)butyric acid]glycol ester, 4,4'-butylidene bis(6-tert-butyl-m-cresol), 2,2'-ethylidene bis(4,6-di-tert-butylphenol), 1,1,3-tris(2-methyl-4-hydroxy-5-tert-butylphenyl)butane, bis[2-tert-butyl-4-methyl-6-(2-hydroxy-3-tert-butyl-5-methylbenzyl)phenyl]terephthalate, 1,3,5-tris(2,6-dimethyl-3-hydroxy-4-tert-butylbenzyl)isocyanurate, 1,3,5-tris(3,5-di-tert-butyl-4-hydroxybenzyl)isocyanurate, 1,3,5-tris(3,5-di-tert-butyl-4-hydroxybenzyl)-2,4,6-trimethylbenzene, 1,3,5-tris[(3,5-di-tert-butyl-4-hydroxyphenyl)propionyloxyethyl]isocyanurate, tetrakis[methylene-3-(3,5-di-tert-butyl-4-hydroxyphenyl)propionate]methane, 2-tert-butyl-4-methyl-6-(2-acryloyloxy-3-tert-butyl-5-methylbenzyl)phenol, 3,9-bis[1,1-dimethyl-2-hydroxyethyl]-2,4,8,10-tetraoxaspiro[5,5]undecane-bis[β-(3-tert-butyl-4-hydroxy-5-butylphenyl)propionate], and triethylene glycol bis[β-(3-tert-butyl-4-hydroxy-5-methylphenyl)propionate].

Examples of the above-mentioned sulfur-based antioxidants include dialkyl thiodipropionates such as dilauryl, dimyristyl, myristyl stearyl, and distearyl esters of thiodipropionic acid, and β-alkylmercaptopropionic acid esters of polyols such as pentaerythritol tetra(β-dodecylmercaptopropionate).

As regards the above-mentioned hydrotalcite compounds, it is possible to preferably use double salt compounds composed of magnesium and aluminum, or zinc, magnesium, and aluminum, as represented by the following general formula (I). Further, the water of crystallization in the hydrotalcite compound may be dehydrated.

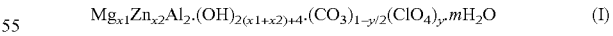

$$Mg_{x1}Zn_{x2}Al_2.(OH)_{2(x1+x2)+4}.(CO_3)_{1-y/2}(ClO_4)_y.mH_2O \quad (I)$$

In the formula, x1, x2, and y represent numbers that fulfill the conditions represented by the following equations, and m represents zero (0) or any given integer: $0 \leq x2/x1 < 10$; $2 \leq x1+x2 < 20$; and $0 \leq y \leq 2$.

The hydrotalcite compound may be a naturally-occurring product or a synthetic product. Examples of methods for synthesizing such synthetic products include known methods disclosed, for example, in JP-B-46-2280, JP-B-50-30039, JP-B-51-29129, JP-B-3-36839, and JP-A-61-174270. In the present invention, various hydrotalcite compounds may be used regardless of the crystal structure, the crystal grain size, etc.

Further, it is possible to use hydrotalcite compounds whose surfaces are covered with, for example, a higher fatty acid such as stearic acid, a higher fatty acid metal salt such as an alkali metal salt of oleic acid, an organic sulfonic acid metal salt such as an alkali metal salt of dodecylbenzenesulfonic acid, a higher fatty acid amide, a higher fatty acid ester, or a wax.

Examples of the above-mentioned epoxy compounds include: epoxidized animal and vegetable oils, such as epoxidized soybean oil, epoxidized linseed oil, epoxidized Chinese wood oil, epoxidized fish oil, epoxidized tallow oil, epoxidized castor oil, and epoxidized safflower oil; and epoxy compounds such as epoxidized methyl-, butyl-, 2-ethylhexyl-, or stearyl stearate, epoxidized polybutadiene, tris(epoxy propyl)isocyanurate, epoxidized tall oil fatty ester, epoxidized linseed oil fatty ester, bisphenol A diglycidyl ether, vinylcyclohexene diepoxide, dicyclohexene diepoxide, and 3,4-epoxy cyclohexyl methyl-epoxy cyclohexane carboxylate.

Examples of the above-mentioned polyol compounds include trimethylol propane, ditrimethylol propane, pentaerythritol, dipentaerythritol, polypentaerythritol, a stearic half-ester of pentaerythritol or dipentaerythritol, bis(dipentaerythritol) adipate, glycerol, and tris(2-hydroxyethyl)isocyanurate.

Examples of the above-mentioned β-diketone compound include acetylacetone, triacetylmethane, 2,4,6-heptatrione, butanoylacetylmethane, lauroylacetylmethane, palmitoylacetylmethane, stearoylacetylmethane, phenylacetylacetylmethane, dicyclohexylcarbonylmethane, benzoylformylmethane, benzoylacetylmethane, dibenzoylmethane, octylbenzoylmethane, stearoylbenzoylmethane, bis(4-octylbenzoyl)methane, benzoyldiacetylmethane, 4-methoxybenzoylbenzoylmethane, bis(4-carboxymethylbenzoyl)methane, 2-carboxymethylbenzoylacetyloctylmethane, dehydroacetic acid, cyclohexan-1,3-dione, 3,6-dimethyl-2,4-dioxycyclohexane-1-carboxylic acid methyl ester, 2-acetylcyclohexanone, dimedone, and 2-benzoylcyclohexane. Metal salts of the above β-diketone compounds may also be used. Examples of metal species capable of providing such metal salts of 3-diketone include: alkali metals such as lithium, sodium, and potassium; alkaline-earth metals such as magnesium, calcium, strontium, and barium; and zinc, aluminum, tin, and alkyltin.

Examples of the above-mentioned UV absorbers include: 2-hydroxybenzophenones such as 2,4-dihydroxybenzophenone, 2-hydroxy-4-methoxybenzophenone, 2-hydroxy-4-octoxybenzophenone, and 5,5'-methylene-bis(2-hydroxy-4-methoxybenzophenone); 2-(2-hydroxyphenyl)benzotriazoles such as 2-(2-hydroxy-5-methylphenyl)benzotriazole, 2-(2-hydroxy-5-tert-octylphenyl)benzotriazole, 2-(2-hydroxy-3,5-di-tert-butylphenyl)-5-chlorobenzotriazole, 2-(2-hydroxy-3-tert-butyl-5-methylphenyl)-5-chlorobenzotriazole, 2-(2-hydroxy-3,5-dicumylphenyl)benzotriazole, 2,2'-methylene-bis(4-tert-octyl-6-benzotriazolyl)phenol, and a polyethylene glycol ester of 2-(2-hydroxy-3-tert-butyl-5-carboxyphenyl)benzotriazole; benzoates such as phenyl salicylate, resorcinol monobenzoate, 2,4-di-tert-butylphenyl-3,5-di-tert-butyl-4-hydroxybenzoate, and hexadecyl-3,5-di-tert-butyl-4-hydroxybenzoate; substituted oxanilides such as 2-ethyl-2'-ethoxyoxanilide and 2-ethoxy-4'-dodecyloxanilide; and cyanoacrylates such as ethyl-α-cyano-β,β-diphenylacrylate and methyl-2-cyano-3-methyl-3-(p-methoxyphenyl)acrylate.

Examples of the above-mentioned hindered amine-based light stabilizers include hindered amine compounds such as 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl) sebacate, bis (1,2,2,6,6-pentamethyl-4-piperidyl) sebacate, tetrakis(2,2,6, 6-tetramethyl-4-piperidyl)butane tetracarboxylate, tetrakis (1,2,2,6,6-pentamethyl-4-piperidyl)butane tetracarboxylate, bis(1,2,2,6,6-pentamethyl-4-piperidyl).di(tridecyl)-1,2,3,4-butane tetracarboxylate, bis(1,2,2,6,6-pentamethyl-4-piperidyl)-2-butyl-2-(3,5-di-tert-butyl-4-hydroxybenzyl)malonate, 1-(2-hydroxyethyl)-2,2,6,6-tetramethyl-4-piperidinol/diethyl succinate polycondensate, 1,6-bis(2,2,6, 6-tetraethyl-4-piperidylamino)hexane/dibromoethane polycondensate, 1,6-bis(2,2,6,6-tetramethyl-4-piperidylamino)hexane/2,4-dichloro-6-morpholino-s-triazine polycondensate, 1,6-bis(2,2,6,6-tetramethyl-4-piperidylamino) hexane/2,4-dichloro-6-tert-octylamino-s-triazine polycondensate, 1,5,8,12-tetrakis[2,4-bis(N-butyl-N-(2,2,6, 6-tetramethyl-4-piperidyl)amino)-s-triazin-6-yl]-1,5,8,12-tetraazadodecane, 1,5,8,12-tetrakis[2,4-bis(N-butyl-N-(1,2, 2,6,6-pentamethyl-4-piperidyl)amino)-s-triazin-6-yl]-1,5,8, 12-tetraazadodecane, 1,6,11-tris[2,4-bis(N-butyl-N-(2,2,6, 6-tetramethyl-4-piperidyl)amino)-s-triazin-6-yl amino] undecane, and 1,6,11-tris[2,4-bis(N-butyl-N-(1,2,2,6,6-pentamethyl-4-piperidyl)amino)-s-triazin-6-ylamino] undecane.

Specific examples of the above-mentioned fillers include calcium carbonate, calcium oxide, calcium hydroxide, zinc hydroxide, zinc carbonate, zinc sulfide, magnesium oxide, magnesium hydroxide, magnesium carbonate, aluminum oxide, aluminum hydroxide, sodium aluminosilicate, hydrotalcite, hydrocalumite, metal silicates such as aluminum silicate, magnesium silicate, calcium silicate, and zeolite, activated clay, talc, clay, colcothar, asbestos, antimony trioxide, silica, glass beads, mica, sericite, glass flakes, asbestos, wollastonite, potassium titanate, PMF, satin spar, Zonolite, MOS, phosphate fiber, glass fiber, carbon fiber, and aramid fiber.

Further, the flame-retardant chlorine-containing resin composition of the present invention may also contain stabilizing aids that are generally used for chlorine-containing resins in amounts that will not impair the effects of the present invention. Examples of such stabilizing aids include diphenylthiourea, anilinodithiotriazine, melamine, benzoic acid, cinnamic acid, p-tert-butylbenzoic acid, zeolite, and perchlorates.

Furthermore, the flame-retardant chlorine-containing resin composition of the present invention may also contain other flame retardants and flame retardant aids in amounts that will not impair the effects of the present invention. Examples of other flame retardants and flame retardant aids include triazine-ring-containing compounds, metal hydroxides, inorganic phosphorus, halogen-based flame retardants, silicon-based flame retardants, phosphate-based flame retardants, condensed-phosphate-based flame retardants, antimony oxides such as antimony trioxide, and other inorganic flame retardant aids and organic flame retardant aids.

Examples of the triazine-ring-containing compounds include melamine, ammeline, benzoguanamine, acetoguanamine, phthalodiguanamine, melamine cyanurate, melamine pyrophosphate, butylene diguanamine, norbornene diguanamine, methylene diguanamine, ethylene dimelamine, trimethylene dimelamine, tetramethylene dimelamine, hexamethylene dimelamine, and 1,3-hexylene dimelamine.

Examples of the metal hydroxides include magnesium hydroxide, aluminum hydroxide, calcium hydroxide, barium hydroxide, zinc hydroxide, and "KISUMA 5A" (magnesium hydroxide; product of Kyowa Chemical Industry Co., Ltd.).

Examples of the phosphate-based flame retardants include trimethyl phosphate, triethyl phosphate, tributyl phosphate, tributoxyethyl phosphate, trischloroethyl phosphate, tris-dichloropropyl phosphate, triphenyl phosphate, tricresyl phosphate, cresyl diphenyl phosphate, trixylenyl phosphate, octyl diphenyl phosphate, xylenyl diphenyl phosphate, tri-sisopropylphenyl phosphate, 2-ethylhexyl diphenyl phosphate, t-butylphenyl diphenyl phosphate, bis-(t-butylphenyl) phenyl phosphate, tris-(t-butylphenyl)phosphate, isopropylphenyl diphenyl phosphate, bis-(isopropylphenyl) diphenyl phosphate, and tris-(isopropylphenyl)phosphate.

Examples of the condensed-phosphate-based flame retardants include 1,3-phenylene bis(diphenyl phosphate), 1,3-phenylene bis(dixylenyl phosphate), and bisphenol A bis (diphenyl phosphate).

Examples of other inorganic flame retardant aids include inorganic compounds such as titanium oxide, aluminum oxide, magnesium oxide, hydrotalcite, and talc, and surface-treated products thereof, and it is possible to use various commercially-available products, such as "TIPAQUE R-680" (titanium oxide; product of Ishihara Sangyo Kaisha, Ltd.), "Kyowa Mag 150" (magnesium oxide; product of Kyowa Chemical Industry Co., Ltd.), "DHT-4A" (hydrotalcite; product of Kyowa Chemical Industry Co., Ltd.), and "ALCAMIZER P-93" (zinc-modified hydrotalcite; product of Kyowa Chemical Industry Co., Ltd.).

An example of other organic flame retardant aids includes pentaerythritol. In addition, the flame-retardant chlorine-containing resin composition of the present invention may further contain, as necessary, other additives that are generally used for chlorine-containing resins in amounts that will not impair the effects of the present invention. Examples of such additives include cross-linking agents, antistatic agents, antifogging agents, anti-plate-out agents, surface-treating agents, slip additives, flame retardants, antifogging agents, fluorescers, fungicides, bactericides, foaming agents, metal deactivators, mold-release agents, pigments, processing aids, antioxidants, and light stabilizers.

The flame-retardant chlorine-containing resin composition of the present invention can be used regardless of how the chlorine-containing resin is to be processed. For example, such processing methods as rolling, extrusion, melt casting, and pressurized molding may preferably be used.

EXAMPLES

The present invention will be described in further detail below according to Examples and Comparative Examples. The present invention, however, is not to be limited whatsoever to these Examples.

Production Example 1

Component (A): Melamine Pyrophosphate

Melamine pyrophosphate was produced by reacting pyrophosphoric acid and melamine at a 1:1 ratio.

Production Example 2

Component (B): Piperazine Pyrophosphate piperazine pyrophosphate was produced by reacting pyrophosphoric acid and piperazine at a 1:1 ratio.

Examples 1 to 3 and Comparative Example 1

Flame-retardant chlorine-containing resin compositions of the present invention were prepared according to the respective formulations shown in [Table 1] below. Each composition was kneaded and rolled and was then pressed, to prepare a sample piece (100 mm×100 mm×1 mm) pursuant to standards. Using the prepared sample piece, the combustion behavior described below was evaluated using a cone calorimeter.

Antimony trioxide was used as a comparison, and the same evaluation was made thereon.

<Evaluation of Flame-Retardant Properties>

Flame-retardant properties were evaluated by measuring the heat release rate using a cone calorimeter ("CONE III" manufactured by Toyo Seiki Seisaku-sho, Ltd.). The maximum heat release rate for each sample (sample size: 100 mm×100 mm×1 mm; radiant heat: 50 kW/m$^2$) is shown in [Table 1] below.

<Evaluation of Smoke Emission Properties>

Smoke emission properties were evaluated by measuring the smoke concentration in the same way using the above-mentioned cone calorimeter. The maximum smoke concentration for each sample is shown in [Table 1] below.

<Evaluation of Carbon Monoxide Concentration>

The carbon monoxide concentration was evaluated by measuring the concentration of carbon monoxide using the above-mentioned cone calorimeter. The maximum carbon monoxide concentration and the average carbon monoxide concentration until 150 seconds after the time of ignition are shown in [Table 1] below.

TABLE 1

|  | Example 1 | Example 2 | Example 3 | Comparative Example 1 |
|---|---|---|---|---|
| Vinyl chloride resin (Degree of polymerization: 800) | 100 | 100 | 100 | 100 |
| Component (A): Melamine pyrophosphate | 4 | 3.8 | 7.6 |  |
| Component (B): Piperazine pyrophosphate | 6 | 5.7 | 11.4 |  |
| Component (C): Wood flour *1 | 82.5 | 82.5 | 82.5 | 82.5 |
| Component (D): Zinc oxide |  | 0.5 | 1 |  |
| Comparative flame retardant: Antimony trioxide |  |  |  | 10 |
| ADEKA STAB RX-210 *2 | 4 | 4 | 4 | 4 |
| Calcium carbonate | 10 | 10 | 10 | 10 |
| Modified acrylic rubber *3 | 4 | 4 | 4 | 4 |
| Acrylic processing aid *4 | 3 | 3 | 3 | 3 |
| RIKESTER SL-02 *5 | 0.3 | 0.3 | 0.3 | 0.3 |
| Epoxidized soybean oil | 2 | 2 | 2 | 2 |
| Maximum heat release rate (kW/m$^2$) | 223 | 238 | 235 | 245 |
| Maximum smoke concentration (1/m) | 10.5 | 13.9 | 10.3 | 14.9 |
| Maximum carbon monoxide concentration (ppm) | 838 | 935 | 770 | 1725 |
| Average carbon monoxide concentration (ppm) | 283 | 273 | 286 | 401 |

(Each formulation in parts by mass)
*1 "Wood flour": Boxtree wood flour; 100 mesh (approx. 150 μm)
*2 "ADEKA STAB RX-210": Ca—Zn-based powdery stabilizer manufactured by Adeka Corporation
*3 "Modified acrylic rubber": "Kane Ace FM", an impact-resistance improver for vinyl chloride resin manufactured by Kaneka Corporation
*4 "Acrylic processing aid": "Metablen P-551A" manufactured by Mitsubishi Rayon Co., Ltd.
*5 "RIKESTER SL-02": Dipentaerythritol hexastearate manufactured by Riken Vitamin Co., Ltd.

INDUSTRIAL APPLICABILITY

As described above, the present invention can provide a chlorine-containing resin composition that contains wood flour but has excellent flame-retardant properties and is restrained from producing toxic gases and smoke, and particularly restrained from producing carbon monoxide, when combusted.

Accordingly, the flame-retardant chlorine-containing resin composition of the present invention having the above characteristics can be used for: construction and architectural materials, such as decking materials, fence materials, frameworks, moldings, profiles of windows and doors, shingles, roofing materials, panels, wall materials, interior and exterior materials for houses, terraces, and balconies; automotive materials such as interior materials for cars, inner panels, rear shelves, side moldings, and covers for spare tires; materials for civil works such as promenades, equipment for parks, docks, and wooden causeways; and other uses for consumer and industrial needs, such as picnic tables, benches, pallets, chairs, desks, furniture, and handrails.

The invention claimed is:

1. A flame-retardant chlorine-containing resin composition, comprising a blend of component (A), component (B), and component (C) into a chlorine-containing resin:
Component (A): a solid melamine pyrophosphate compound represented by formula (1);
Component (B): a solid piperazine (poly)phosphate compound represented by formula (3); and
Component (C): wood flour;

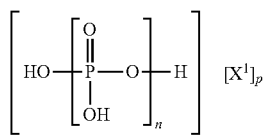
(1)

wherein,
n is 2,
$X^1$ is melamine, and
p is 2;

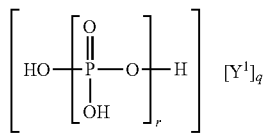
(3)

wherein,
r represents a number from 1 to 100,
$Y^1$ is piperazine, and
q is 1.

2. The flame-retardant chlorine-containing resin composition according to claim 1, further comprising zinc oxide as component (D).

3. The flame-retardant chlorine-containing resin composition according to claim 1, wherein the piperazine polyphosphate is piperazine pyrophosphate.

4. The flame-retardant chlorine-containing resin composition according to claim 1, wherein the chlorine-containing resin is vinyl chloride resin.

5. The flame-retardant chlorine-containing resin composition according to claim 1, wherein the blend contains 0.1 to 40 parts by mass of component (A) to 100 parts by mass of the chlorine-containing resin.

6. The flame-retardant chlorine-containing resin composition according to claim 1, wherein the blend contains 1 to 30 parts by mass of component (A) to 100 parts by mass of the chlorine-containing resin.

7. The flame-retardant chlorine-containing resin composition according to claim 1, wherein the blend contains 0.1 to 50 parts by mass of component (B) to 100 parts by mass of the chlorine-containing resin.

8. The flame-retardant chlorine-containing resin composition according to claim 1, wherein the blend contains 1 to 40 parts by mass of component (B) to 100 parts by mass of the chlorine-containing resin.

9. The flame-retardant chlorine-containing resin composition according to claim 1, wherein the blend contains 1 to 90 parts by mass of a total of component (A) and component (B) to 100 parts by mass of the chlorine-containing resin.

10. The flame-retardant chlorine-containing resin composition according to claim 1, wherein the blend contains 5 to 70 parts by mass of a total of component (A) and component (B) to 100 parts by mass of the chlorine-containing resin.

11. The flame-retardant chlorine-containing resin composition according to claim 1, wherein the blend has a weight ratio (A/B) of component (A) to component (B) in a range of 20/80 to 50/50.

12. The flame-retardant chlorine-containing resin composition according to claim 1, wherein the blend has a weight ratio (A/B) of component (A) to component (B) in a range of 30/70 to 50/50.

13. The flame-retardant chlorine-containing resin composition according to claim 1, wherein the wood flour has an average particle size of 30 to 500 μm.

14. The flame-retardant chlorine-containing resin composition according to claim 1, wherein the wood flour has an average particle size of 100 to 200 μm.

15. The flame-retardant chlorine-containing resin composition according to claim 1, wherein the blend contains 10 to 160 parts by mass of component (C) to 100 parts by mass of the chlorine-containing resin.

16. The flame-retardant chlorine-containing resin composition according to claim 1, wherein the blend contains 60 to 100 parts by mass of component (C) to 100 parts by mass of the chlorine-containing resin.

17. The flame-retardant chlorine-containing resin composition according to claim 2, wherein the blend contains 0.01 to 4 parts by mass of component (D) to 100 parts by mass of the chlorine-containing resin.

18. The flame-retardant chlorine-containing resin composition according to claim 2, wherein the blend contains 0.1 to 5 parts by mass of component (D) to 100 parts by mass of the chlorine-containing resin.

* * * * *

UNITED STATES PATENT AND TRADEMARK OFFICE
CERTIFICATE OF CORRECTION

PATENT NO. : 8,513,336 B2  Page 1 of 1
APPLICATION NO. : 12/866115
DATED : August 20, 2013
INVENTOR(S) : Ishizuka et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 241 days.

Signed and Sealed this

Fifteenth Day of September, 2015

Michelle K. Lee
*Director of the United States Patent and Trademark Office*